United States Patent [19]
Bates et al.

[11] Patent Number: 6,037,935
[45] Date of Patent: Mar. 14, 2000

[54] WEB PAGE EXPLORATION INDICATOR AND METHOD

[75] Inventors: Cary Lee Bates; Paul Reuben Day, both of Rochester, Minn.

[73] Assignee: International Business Machines Corporation, Armonk, N.Y.

[21] Appl. No.: 09/067,458

[22] Filed: Apr. 28, 1998

[51] Int. Cl.[7] .................................................. G06F 15/00
[52] U.S. Cl. ......................... 345/335; 345/346; 345/347; 345/357
[58] Field of Search .................................. 345/335, 346, 345/347, 356, 357

[56] References Cited

U.S. PATENT DOCUMENTS

| | | | |
|---|---|---|---|
| 5,812,134 | 9/1998 | Pooser et al. | 345/356 |
| 5,877,766 | 3/1999 | Bates et al. | 345/357 |
| 5,890,172 | 3/1999 | Borman et al. | 707/501 |

*Primary Examiner*—Ba Huynh
*Attorney, Agent, or Firm*—Martin & Associates, L.L.C.; Derek P. Martin

[57] ABSTRACT

A web page exploration indicator displays to a user the degree of exploration for a web page or for one or more links on a web page. A user defines the manner for displaying exploration information according to a specified exploration criteria. The exploration criteria generally defines which links are taken into consideration when displaying the exploration information. For example, the exploration criteria may analyze links at the next level, may analyze links that have been traversed by the user, or may analyze links to a specified depth. According to the preferred embodiments, the web page exploration indicator provides a visual indication of the degree of exploration for each displayed web page and for each link on the displayed web page. In this manner a user can easily tell from visual indicators on the screen the degree of exploration for each page and for each link on each page.

27 Claims, 7 Drawing Sheets

Web Page Exploration Indicator Properties

Indicator Display
- ● On
- ○ Off

Appearance
- ○ Icon
- ○ Bar
  - ○ Side
  - ○ Bottom
- ● Mouse fill-in
- ○ Scalar numbers
- ○ Colors
- ○ Color gradient Exploration Criteria
- ○ Next level only
- ● Anything traversed
- ○ Fixed Depth
  - Go [ ] levels deep

FIG. 12

WEB PAGE EXPLORATION INDICATOR AND METHOD

BACKGROUND OF THE INVENTION

1. Technical Field

This invention generally relates to computer networks, such as the Internet. More specifically, this invention relates to an indicator and method for visually indicating the degree of exploration for a web page or for a link on a web page.

2. Background Art

The development of the EDVAC computer system of 1948 is often cited as the beginning of the computer era. Since that time, computer systems have evolved into extremely sophisticated devices, and computer systems may be found in many different settings. The widespread proliferation of computers prompted the development of computer networks that allow computers to communicate with each other. With the introduction of the personal computer (PC), computing became accessible to large numbers of people. Networks for personal computers were developed that allow individual users to communicate with each other. In this manner, a large number of people within a company could communicate with other computers on the network.

One significant computer network that has recently become very popular is the Internet. The Internet grew out of this proliferation of computers and networks, and has evolved into a sophisticated worldwide network of computer system resources commonly known as the "world-wide-web", or WWW. A user at an individual PC (i.e., workstation) that wishes to access the Internet typically does so using a software application known as a web browser. A web browser makes a connection via the Internet to other computers known as web servers, and receives information from the web servers that is displayed on the user's workstation. Information transmitted from the web server to the web browser is generally formatted using a specialized language called Hypertext Markup Language (HTML) and is typically organized into pages known as web pages. Many web pages include one or more special reference locations known as "links" that invoke other web pages. Links allow a web user to easily navigate to other web pages of interest by clicking on the appropriate link with a mouse or other pointing device.

Known web browsers indicate that a link on a page has been explored by coloring the link a different color than links that have not been explored. However, if a user were to follow an explored link, he or she may find numerous links that have not yet been explored on the page corresponding to the link. There is currently no convenient way for a user who is navigating through a web site to determine the degree of exploration for a particular web page or link.

As the number of Internet users, providers, and web servers continues to rapidly expand, it will become increasingly important for a web user to be able to determine the degree of exploration for a link on a web page. Without improvements that can display exploration information to web users, the current methods of displaying web pages and their links will continue to be an impediment to the effective usage of resources available on the Internet and other computer networks.

DISCLOSURE OF INVENTION

According to the present invention, a web page exploration indicator displays to a user the degree of exploration for a web page or for one or more links on a web page. A user defines the manner for displaying exploration information according to a specified exploration criteria. The exploration criteria generally defines which links are taken into consideration when displaying the exploration information. For example, the exploration criteria may analyze links at the next level, may analyze links that have been traversed by the user, or may analyze links to a specified depth. According to the preferred embodiments, the web page exploration indicator provides a visual indication of the degree of exploration for each displayed web page and for each link on the displayed web page. In this manner a user can easily tell from visual indicators on the screen the degree of exploration for each page and for each link on each page.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

BEST MODE FOR CARRYING OUT THE INVENTION

The method and apparatus of the present invention has particular applicability to navigating through web pages on the Internet. For those individuals who are not familiar with the Internet, a brief overview of relevant Internet concepts is presented here.

1. OVERVIEW

Internet Communications

Figure 2:
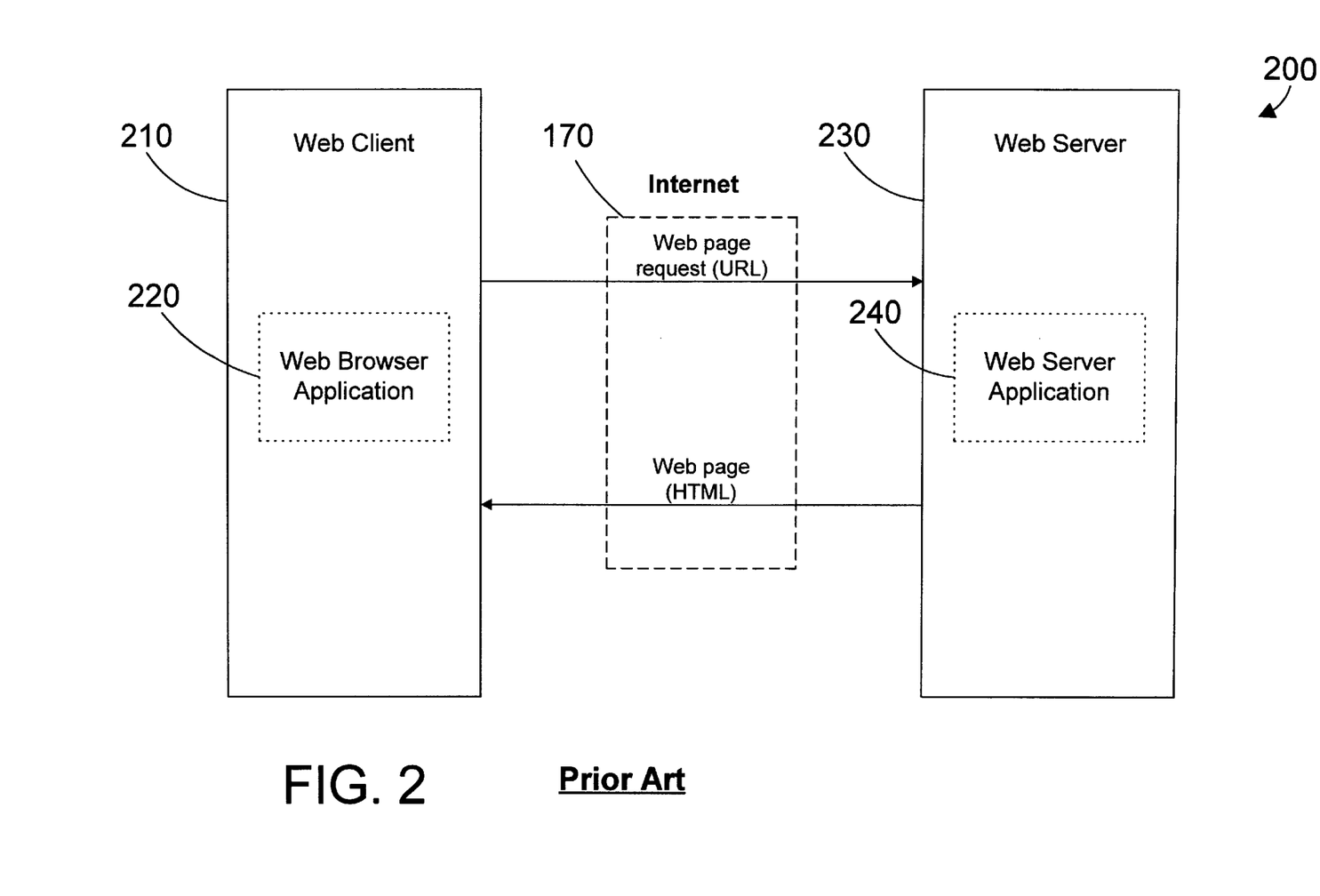
FIG. 2 is a block diagram of a typical Internet connection.

An example of a typical Internet connection is shown in FIG. 2. A user that wishes to access information on the Internet 170 typically has a computer workstation 210 known as a web client that executes an application program known as a web browser 220. Under the control of web browser 220, workstation 210 sends a request for a web page over the Internet 170. Web page data can be in the form of text, graphics and other forms of information, collectively known as MIE data. Each web server on the Internet has a known address, termed the Uniform Resource Locator (URL), which the web browser uses to connect to the appropriate web server. Because web server 230 can contain more than one web page, the user will also specify in the address which particular web page he wants to view on web server 230. A web server computer system 230 executes a web server application 240, monitors requests, and services requests for which it has responsibility. When a request specifies web server 230, web server application 240 generally accesses a web page corresponding to the specific request, and transmits the page to the user's workstation 210.

Web Pages

A web page may contain various types of MIME data. Most web pages include visual data that is intended to be displayed on the monitor of user workstation 210. Web pages are generally written in Hypertext Markup Language (HTML). When web server 230 receives a web page request, it will send the requested page in HTML form across the Internet 170 to the requesting web browser 220. Web browser 220 understands HTML and interprets it and outputs the web page to the monitor of user workstation 210. This web page displayed on the user's screen may contain any suitable MIME data, including text, graphics, and links (which reference addresses of other web pages). These other web pages (i.e., those represented by links) may be on the same or on different web servers. The user can invoke these other web pages by clicking on these links using a mouse or other pointing device. This entire system of web pages with links to other web pages on other servers across the world is known as the "World Wide Web".

2. DETAILED DESCRIPTION

The present invention improves the convenience of browsing web pages by providing an indication of the degree of exploration for each page and for each link. Those skilled in the art will appreciate that the present invention applies equally to the navigation between any linked data, whether the data be in the form of web pages, database records, or other data that may be linked or interrelated. Furthermore, while the preferred embodiments described herein discuss web pages on the Internet, the present invention expressly encompasses any and all means and methods for linking data together. Thus, browsing pages on an intranet is likewise within the scope of the invention, as is the navigation through any set of data linked to other data on a computer system.

Figure 1:
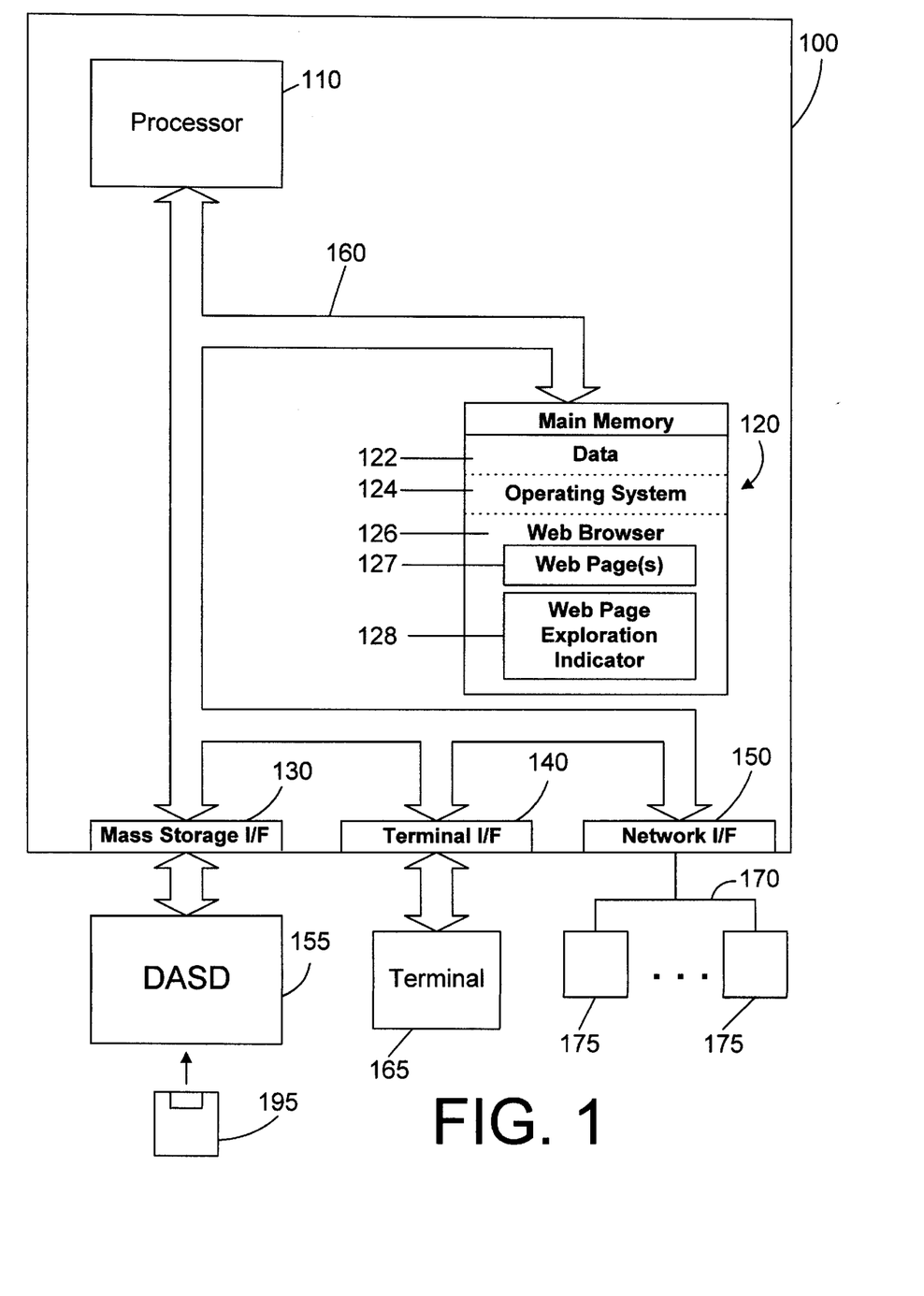
FIG. 1 is a block diagram of a computer system that displays the degree of exploration for web pages and links in accordance with the preferred embodiments.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 includes data 122, operating system 124, and a web browser 126 that is used to view one or more web pages 127, and that contains a web page exploration indicator 128. In the best mode of the invention, web page exploration indicator 128 is a part of web browser 126; however, it is within the scope of the present invention for web page exploration indicator 128 to be a separate computer program, or to be a part of other computer programs in a computer system. For example, web page exploration indicator 128 may be a computer program separate from all others, may be a part of operating system 124, or may be a plug-in for web browser 126.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, browser 126, web pages 127, and web page exploration indicator 128 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 1 0 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160. Operating system 124 is a multitasking operating system known in the industry as OS/400; however, those skilled in the art will appreciate that the spirit and scope of the present invention is not limited to any one operating system.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of object update mechanism 129 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 3:
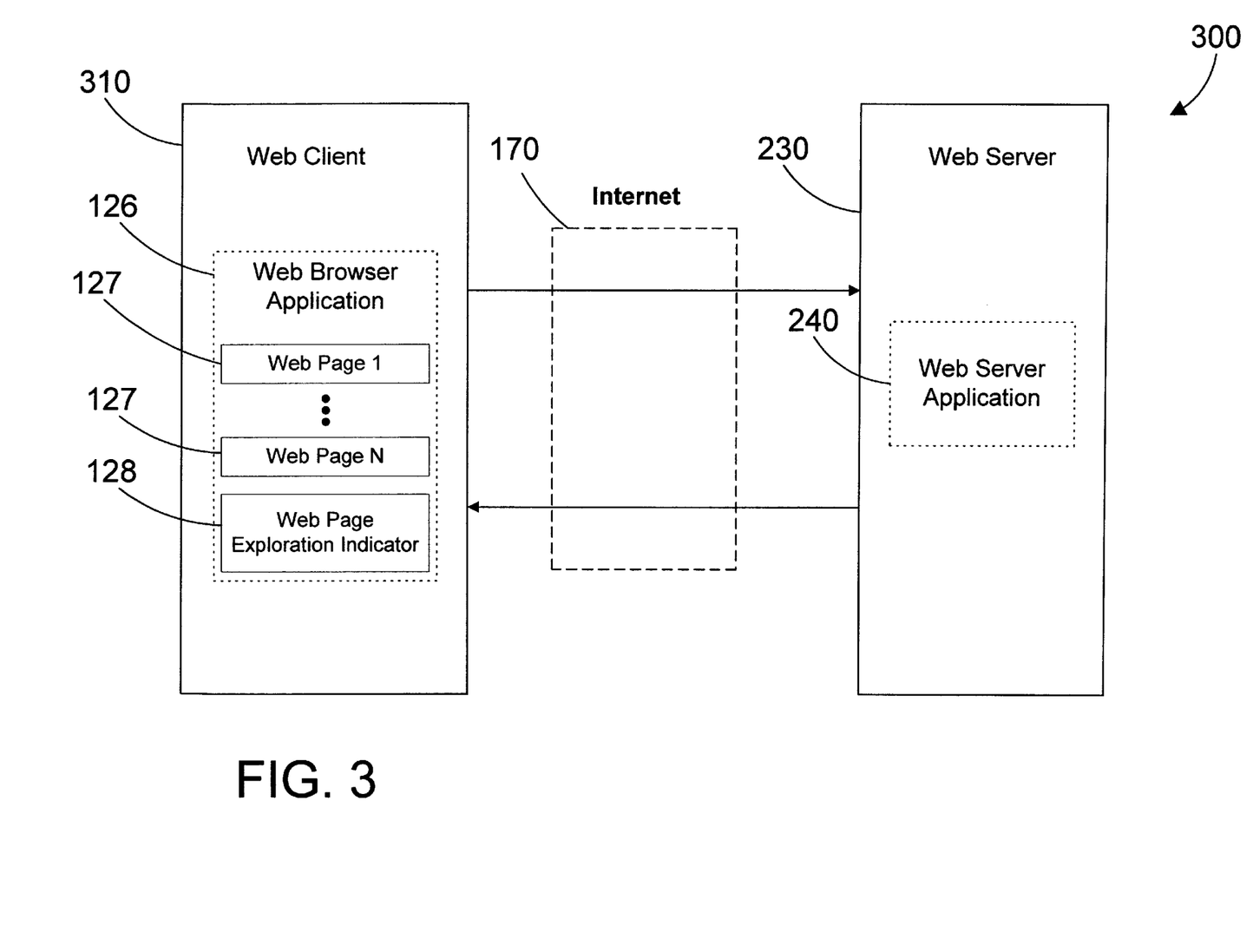
FIG. 3 is a block diagram of a computer system that displays the degree of exploration for web pages in accordance with a preferred embodiment.

Referring to FIG. 3, a computer system 300 in accordance with a preferred embodiment has a web server 230 running a web server application 240 couple to the Internet 170, as in the prior art. However, the invention defines a new web client 310 that includes web browser application 126 that contains web page exploration indicator 128. Web page exploration indicator 128 provides a visual indication to the user of the degree of exploration for a particular web page 127 and for one or more links on the web page. The remainder of this specification will describe the preferred embodiments for the web page exploration indicator 128 which visually displays to a user the degree of exploration for a particular web page and for links on the web page.

Figure 4:
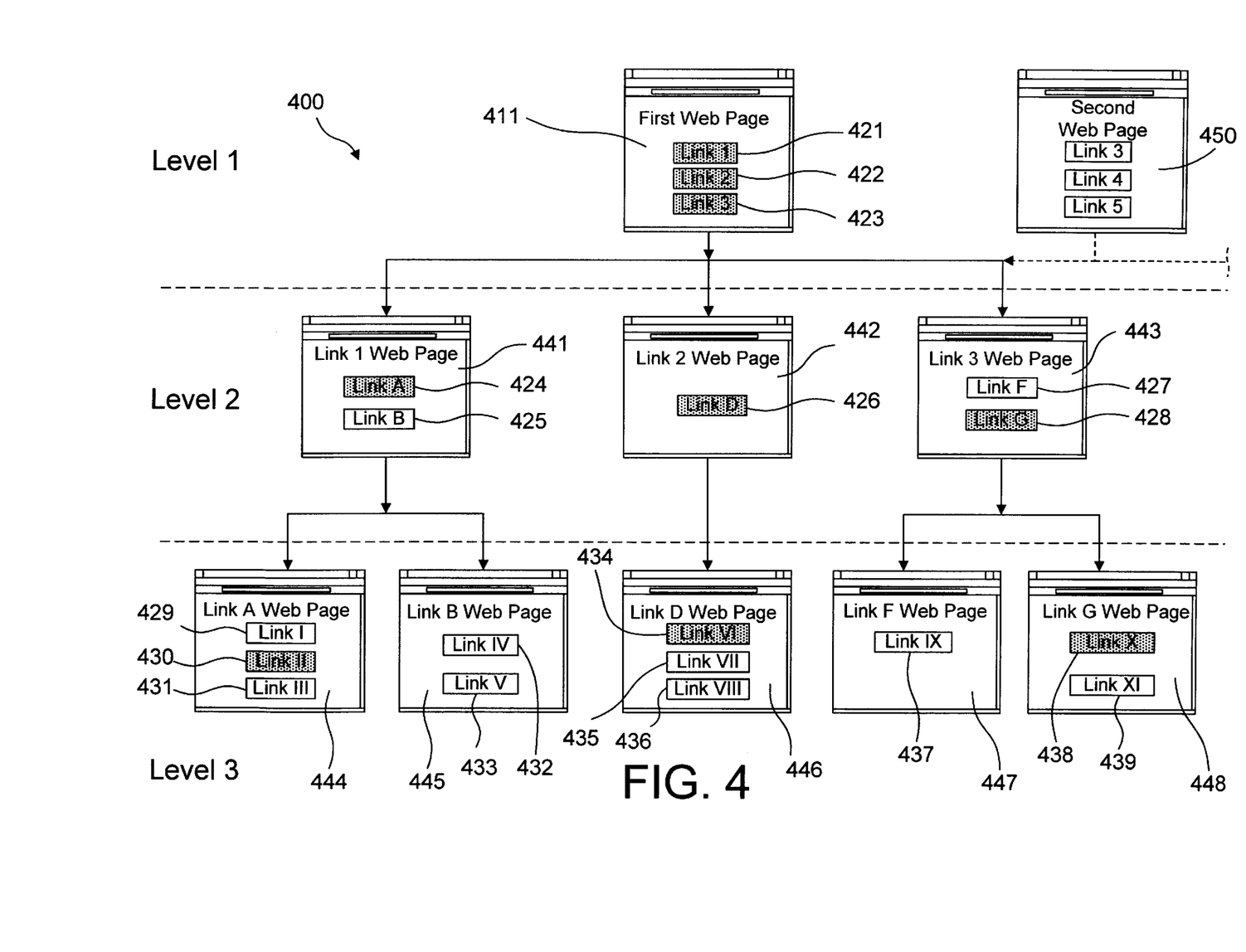
FIG. 4 is a block diagram showing a group of web pages for illustrating the function of the web page exploration indicator of FIG. 1.

A sample hierarchy of web pages is shown in FIG. 4 as an example that will help to illustrate the salient aspects of the preferred embodiments. A first web page 411 includes three links 421, 422 and 423. A second web page 450 includes three links as well. Link 1 421 on first web page 411 corresponds to a web page 441 that has two links 424 and 425. Link 2 422 on first web page 411 corresponds to a web page 442 that has one link 426. Link 3 423 on first web page 411 corresponds to a web page 443 that has two links 427 and 428.

In similar fashion, the links 424 and 425 on web page 441 correspond to web pages 444 and 445 with their own links; link 426 on web page 442 corresponds to web page 446 with its own links; and the links 427 and 428 on web page 443 correspond to web pages 447 and 448 with their own links. For the sake of explaining the preferred embodiments, the top level of web pages is referred to as level 1, the second as level 2, and the third as level 3. One skilled in the art will recognize that each of the links at level 3 will have corresponding pages at other levels. The world-wide web provides a very complex web of pages on many different levels. The example of FIG. 4 is simplified to illustrate the preferred embodiments herein. For the sake of example we assume that the following links have been visited: at level 1, link 1 421, link 2 422 and link 3 423; at level 2, link A 424, link D 426, and link G 428; at level 3, link II 430, link VI 434, and link X 438. Each of these links are shaded in FIG. 4 to indicate that these links have been visited.

Figure 5:
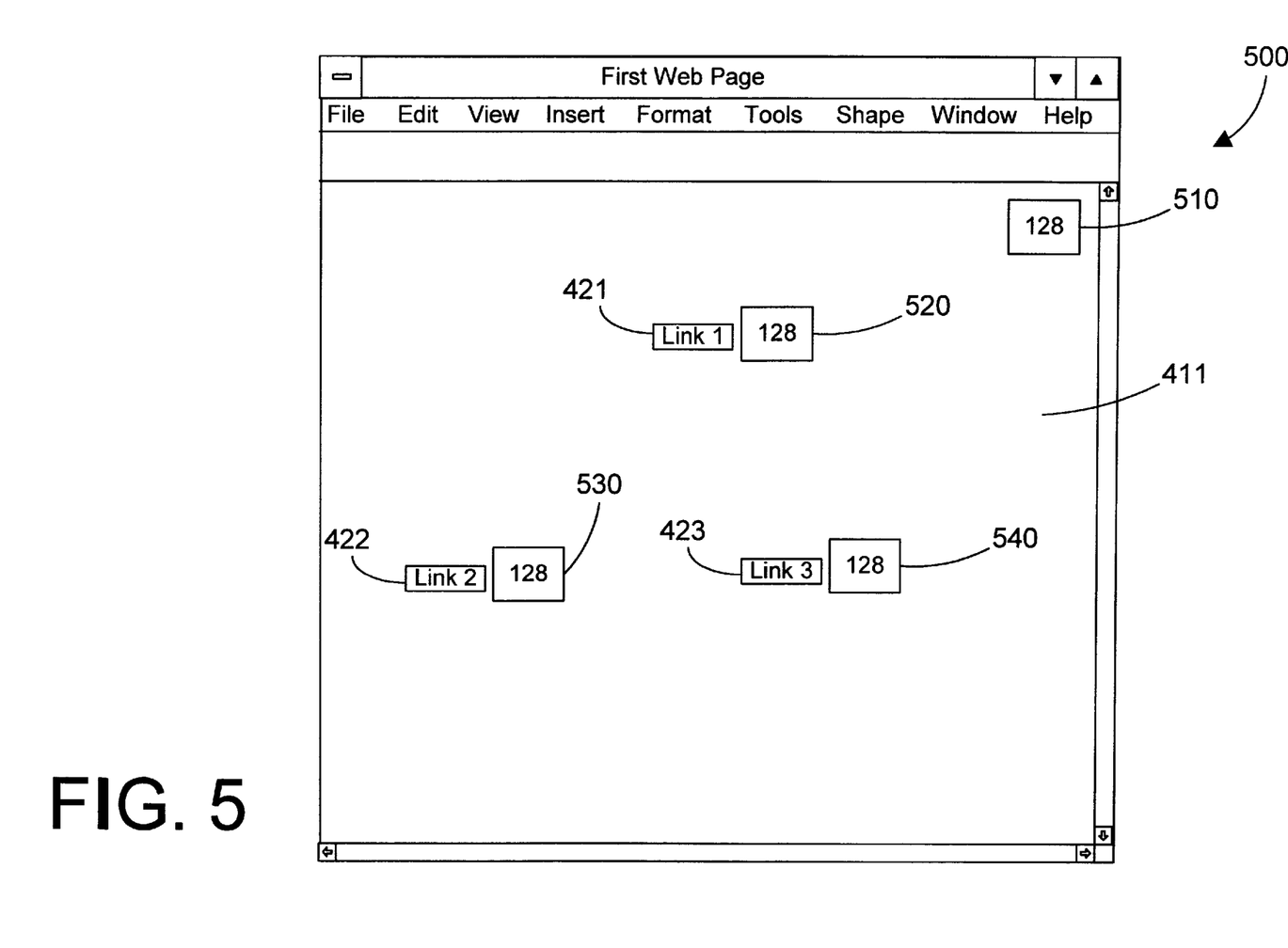
FIG. 5 is a sample browser display showing the first web page of FIG. 4 with its three links and associated web page exploration indicators.

Referring to FIG. 5, a display 500 of first web page 411 is shown. Display 500 represents how web page 411 is displayed to a user. According to the best mode of the invention, page 411 includes four different web page exploration indicators 128, namely 510, 520, 530 and 540. The first web page exploration indicator 510 is an indicator that displays to the user a visual indication of the degree of exploration for page 411. The degree of exploration may be determined in a variety of ways, as described in more detail below. Web page exploration indicator 520 displays the degree of exploration for link 1 421; web page exploration indicator 530 displays the degree of exploration for link 2 422; and web page exploration indicator 540 displays the degree of exploration for link 3 423.

The preferred embodiments of the present invention are explained in terms of the "degree of exploration" for a web page or a link on a web page. The degree of exploration is based on one or more exploration criteria. The exploration criteria are suitably setup by a user according to the user's preference. One example of a suitable exploration criteria examines the degree of exploration for the "next level". This criteria, when applied to a web page, examines how many links on the web page have been visited. When applied to a selected link, this criteria examines how many of the links on the web page that correspond to the selected link (i.e., at the next level) have been explored. For the example in FIG. 4, we consider the example of first web page 411, as illustrated in FIG. 5. For the discussion herein, we describe the web page exploration indicator as displaying a percentage that represents the degree of exploration for a page or a link. This percentage may be represented visually in a number of different forms, as described below with respect to FIGS. 7–11.

Referring again to FIGS. 4 and 5, because all three of the links on page 411 have been explored, web page exploration indicator 510 for web page 411 will show 100% exploration. To determine the degree of exploration for link 1, we must descend to the next level to determine how many links on the web page corresponding to link 1 have been visited. For our example, link A 424 has been visited but link B 425 has not, so the degree of exploration for link 1 421 will be 50%, and the web page exploration indicator 520 for link 1 421 will indicate 50% exploration. Descending to the next level for link 2 422, web page 442 that corresponds to link 2 has only one link, link D 426, and link D 426 has been visited. Thus, the web page exploration indicator 530 for link 2 422 will indicate 100% exploration. Descending to the next level for link 3 423, web page 443 that corresponds to link 3 has two links 427 and 428, one of which has been visited. Web page exploration indicator 540 for link 3 will therefore display 50% exploration.

Another suitable exploration criteria examines all links that have been traversed. For the example of FIG. 4, the web page exploration indicator 520 for a link counts the total links in web pages that have been visited under that link and divides by the total links in visited links under that link. For example, for link 1 421, only link A on web page 441 has been visited, and only link II on the web page corresponding to link A has been visited. The total links in visited links below link 1 is five, two links 424 and 425 in web page 441, and three links 429, 430 and 431 in web page 444. Of these five links, a total of two have been visited. Thus, the degree of exploration 520 for link 1 421 is 2/5, or 40%. The links on link B web page 445 are not considered because link B 425 has not been visited. In similar fashion, web page exploration indicator 530 for link 2 422 is 2/4, or 50%. Web page exploration indicator 540 for link 3 423 does not include link IX 437 because link F 427 has not been visited. Web page exploration indicator 540 is thus 2/4, or 50%.

Note that the web page exploration indicator 510 for web page 411 suitably derives its information from the web page exploration indicators for all of its links. Thus, the degree of exploration for link 1 is 2/5, for link 2 is 2/4, and for link 3 is 2/4. The total is 6/13, or 46.2%, which is displayed in web page exploration indicator 510 for web page 411.

One significant advantage of selecting an exploration criteria that examines only links that have been traversed is that no network traffic is required. If a page has been traversed, it will likely reside in the web browser's cache, and determining the degree of exploration for a page or a link is a matter of reading information that already resides in the cache. In the alternative, when a web page is visited, the link information could be stored in some data structure to retain the information regarding exploration even when the web browser's cache is flushed. In this manner, exploration information is available without generating additional network traffic.

Yet another suitable exploration criteria examines all links down to a specified level. For the example of FIG. 4, we assume that the links at level 3 access pages that are in the next level (not shown). We further assume that exploration criteria is set to a depth of two, which means that the exploration criteria for the two levels below are shown. Thus, for web page 411, its links 421–423 at level 1 are the first level deep, and the links 424–428 at level 2 are the second level deep. For the links on web page 411, the links 424–428 at level 2 are the first level deep, and the links 429–439 at level 3 are the second level deep. Thus, if a two level exploration criteria is specified, the web page exploration indicator 510 for web page 411 sees a total of eight links: on the first level down from page 411 there are three links 421–423; on the second level down there are two links 424 and 425 on page 441, one link 426 on page 442, and two links 427 and 428 on page 443. Of these eight links, six have been visited. Thus, for an exploration criteria that specifies all links two levels deep, the web page exploration criteria 510 for web page 411 would indicate 6/8, or 75%.

A two-level deep exploration criteria for the links 421–423 on page 411 must examine all links at the next two levels, namely levels 2 and 3. Thus, for link 1 421, the links two levels deep are: at level 2, links 424 and 425; and at level 3, links 429–433, for a total of 7 links. Of these seven links, two have been visited, so the web page exploration indicator 520 for link 1 421 would indicate 2/7, or 28.6%. For link 2 422, two of the four total links in pages 442 and 446 have been visited, so the web page exploration indicator 530 for link 2 422 would indicate 2/4, or 50%. For link 3 423, two of the five total links in pages 443, 447 and 448 have been visited, so web page exploration indicator 540 for link 3 423 would indicate 2/5, or 40%.

Specifying a fixed depth may result in network traffic to bring in pages that have not yet been visited to determine their links. However, various methods are known in the art for prefetching pages to allow for quicker browsing, which would eliminate the network traffic that would normally be required to bring in pages that have not yet been visited.

The three different exploration criteria described above are shown as examples of possible criteria that could be displayed in web page exploration indicator 128. Of course, many different heuristics could be used to generate a number that is representative of the degree of exploration for a page or a link. For example, a user could combine the "anything traversed" criteria with the "fixed depth" criteria to include only those links visited down to a specified level. Another possible heuristic would weight the visited web pages according to their level so that pages that are closer have a greater impact on the degree of exploration than more distant pages. The present invention expressly encompasses any and all methods and exploration criteria for computing a degree of exploration for a web page or a link.

The present invention extends to any visual indication of the degree of exploration for a web page or a link. Some examples are presented herein to illustrate just a few of the many different ways the degree of exploration could be displayed to a user. These examples show the display of web page exploration indicator 128 next to a link 421 to indicate the degree of exploration for that link (such as indicators 520, 530 and 540 of FIG. 5), but the examples apply equally to an indicator for a particular web page being viewed as well (such as indicator 510 of FIG. 5).

Figure 7:
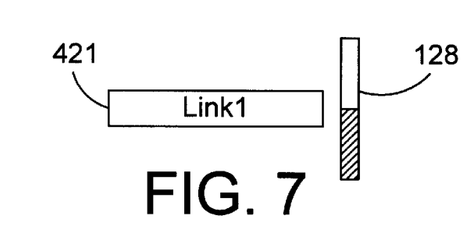
FIGS. 7–11 each show different possible web page exploration indicators.
Figure 8:
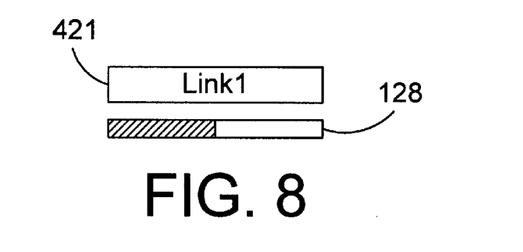

Referring to FIG. 7, web page exploration indicator 128 is in the form of a bar graph to the right of the link that is filled to a level indicative of the degree of exploration for the link. In FIG. 8, the bar graph is put on its side, with the degree of exploration represented by the portion filled in to the left. Each of the bar graphs of FIGS. 7 and 8 represent that the link has been 50% explored. Color could be used to enhance the visual display of the degree of exploration.

Figure 9:
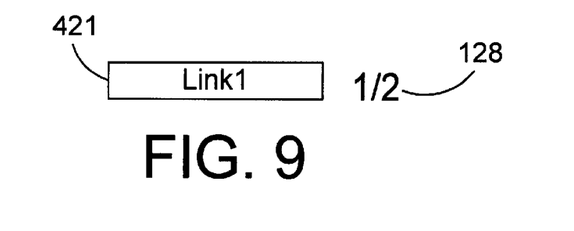

Referring to FIG. 9, web page exploration indicator 128 could also be displayed as an ordinal fraction. For example, if there are two links on the page that corresponds to link 1 421, and if one of the two links has been explored, a fraction ½ could be displayed to indicate that one of the two links on that page have been explored.

Figure 10:
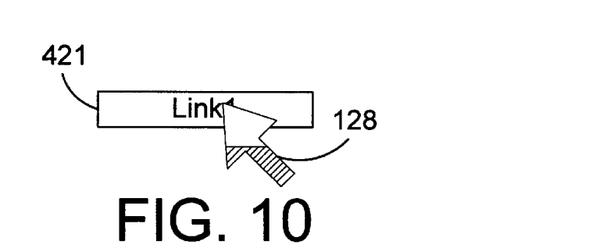
Figure 11:
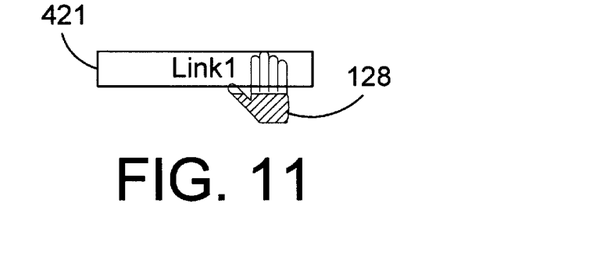

Referring to FIGS. 10 and 11, another option for indicating the degree of exploration for a link is to provide a visual indication on a pointing device. For example, known mouse and trackball devices commonly used with modem computer systems may include an arrow, hand, or other pointer. As shown in FIG. 10, an arrow may be filled in proportional to the degree of exploration for the link when the arrow points to the link. In similar fashion, the pointer may be a hand when located over a link, and the hand may be filled in according to the degree of exploration of the link.

Another option for visually indicating the degree of exploration for a link is not shown in the figures due to the difficulty or representing colors in a black-and-white drawing. The link itself can be colored with different colors or a color gradient to indicate the degree of exploration for the link. Let's assume for the sake of example that five colors are used to indicate the degree of exploration of a link. Blue represents a "cool" link, one that is relatively unexplored. Green represents more exploration than a blue link. Yellow indicates a link that has been somewhat explored. Orange represents a link that has been significantly explored. And red indicates a "hot" link that has been mostly or completely explored. The color of the link may change from one color to the next as the degree of exploration increases. In the alternative, the color of the link may be represented by a gradient that displays the link in two or more colors, depending on the degree of exploration for the link.

Figure 6:
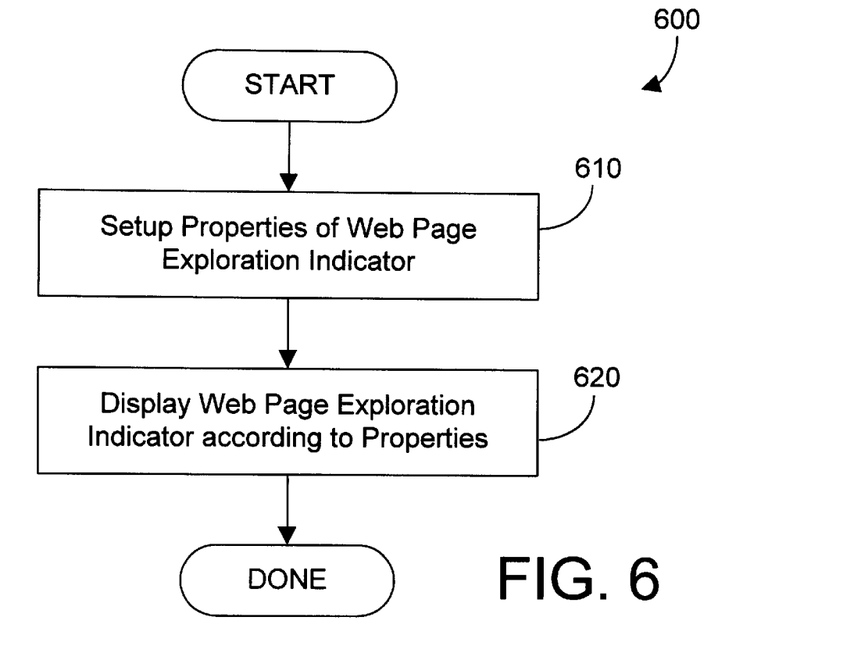
FIG. 6 is a flow diagram of a method for displaying web page exploration information in accordance with the preferred embodiments.

Referring now to FIG. 6, a method 600 for displaying web page exploration indicator 128 in accordance with the preferred embodiments begins by setting up the properties of the web page exploration indicator (step 610). Once the properties have been setup, the web page exploration indicator 128 is displayed (step 620). According to the best mode of the invention, a web page exploration indicator 128 is included on each web page to indicate the degree of exploration for the web page, as well as for each link on the web page, as illustrated in the display of sample web page 411 of FIG. 5.

Figure 12:
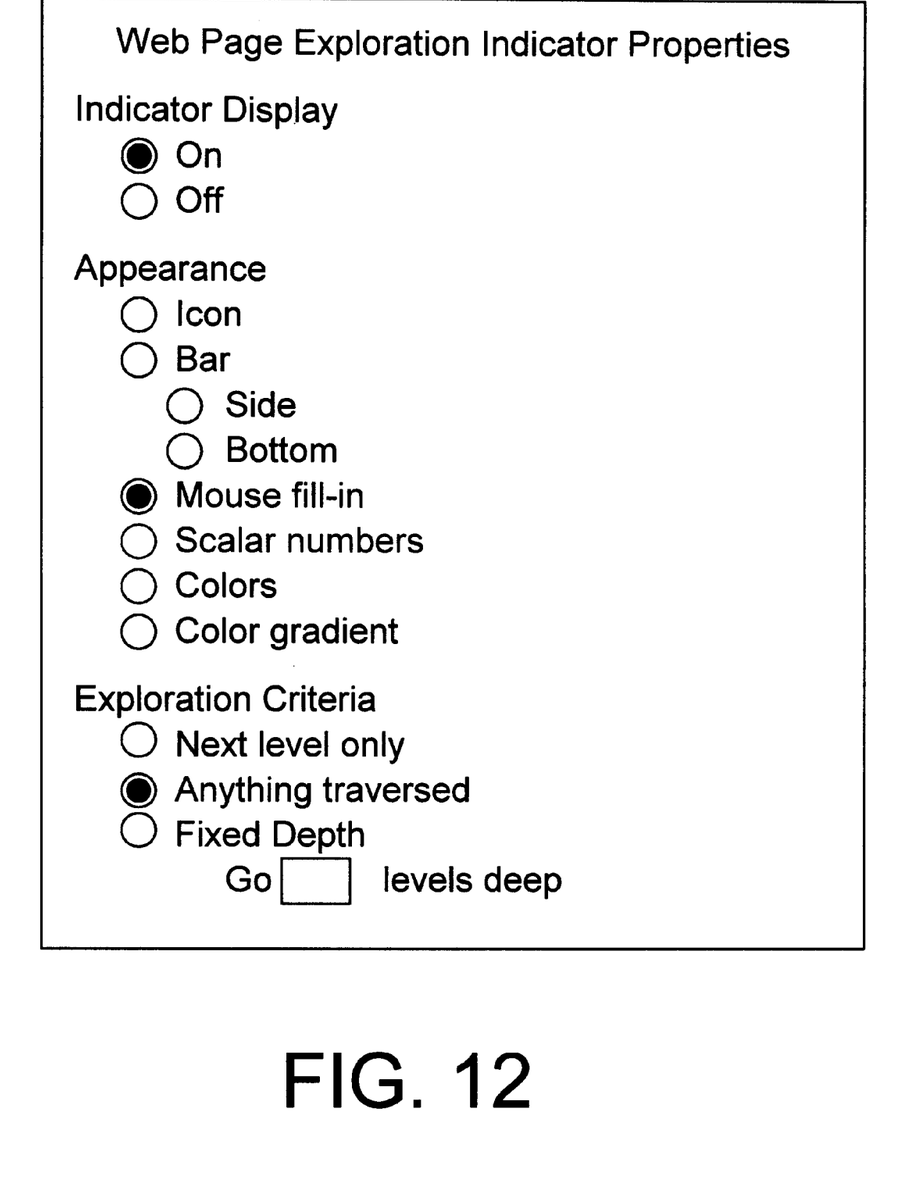
FIG. 12 is a display of a possible setup menu for the web page exploration indicator of FIG. 1.

The properties for the web page exploration indicator may be setup in step 610 in a variety of different ways. One suitable way would allow a user to setup a global default that would be applied to the web page exploration indicator 128 for each web page and for each link. The user could then override the default values for any particular web page exploration indicator 128. For example, a user could select from a menu on the web browser to setup the default properties for all web page exploration indicators. A suitable setup menu is shown in FIG. 12, and allows the user to specify whether or not the indicator will be displayed, the appearance of the indicator, and the exploration criteria that will be used. For the specific example shown in FIG. 12, the indicator will be displayed as a fill-in for the mouse pointer when the pointer is over a link or over the indicator on a page, and the exploration criteria used will be that all links traversed will be included in calculating the degree of exploration for a link. Once the user sets up the global default, each web page exploration indicator on each page and for each link may be subsequently setup to be different from the default. For example, while a user is holding a mouse pointer over a link, clicking the right button of the mouse could invoke the properties menu of FIG. 12, thereby allowing a user to set the properties for the web page exploration indicator for that particular link rather than relying on the default settings.

Note that the web page exploration indicator 128 may be defined differently for web pages than it is for links. For example, an exploration indicator for a web page may indicate the percent of the page that the user has viewed rather than relating to a degree of exploration of links on the page. For a long document that requires the user to scroll down many screens to view all the information, it may be useful to distinguish between portions of a web page that have been viewed and portions that have not been viewed. This and other variations are within the scope of the preferred embodiments disclosed herein.

The present invention provides a user with information regarding the degree of exploration of a web page or link while navigating web sites. A user will be able to tell which pages and links are "hot", meaning that the pages or links have been substantially explored, and which are "cold", meaning that they are relatively unexplored. This information will allow users to more efficiently navigate or "surf" the world-wide-web to retrieve desired information.

While the invention has been particularly shown and described with reference to preferred exemplary embodiments thereof, it will be understood by those skilled in the art that various changes in form and details may be made therein without departing from the spirit and scope of the invention. For example, while the preferred embodiments herein are discussed in terms of HTML pages, other page formats and data formats are equally encompassed by the present invention. The term page as used herein is intended to encompass any quantum of data that may be processed or displayed. In addition, while the invention is shown for exemplary purposes with regard to web clients and web servers that communicate over the Internet, the present invention applies to any type of client/server scenario on any suitable network. Also, the description herein refers to a "user" that may perform certain functions. The term "user" as used in the specification and claims herein expressly includes any agent that may perform the functions of a user, including without limitation human users, computer functions, and software programs in any form.

We claim:

1. An apparatus comprising:
   at least one processor;
   a memory coupled to the at least one processor;
   a display coupled to the at least one processor;
   a web page residing in the memory and displayed to a user on the display, the web page containing at least one link;
   a web page exploration indicator residing in the memory and executed by the at least one processor, the web page exploration indicator generating a display indicator corresponding to each link to another web page in the displayed web page, each display indicator being displayed on the display in proximity to its corresponding link in the displayed web page, each display indicator providing a visual indication of the degree of exploration of its corresponding link according to at least one exploration criterion.

2. The apparatus of claim 1 wherein the web page exploration indicator further generates a display indicator that provides a visual indication of the degree of exploration for the web page.

3. The apparatus of claim 1 wherein the at least one exploration criterion determines the total number of links on each page corresponding to each link, and divides the number of visited links by the total number of links.

4. The apparatus of claim 1 wherein the at least one exploration criterion determines the number of links on each page corresponding to each link to a predetermined level, and divides the number of visited links to the predetermined level by the number of links.

5. The apparatus of claim 1 wherein the at least one exploration criterion determines the total number of links on pages with a specified relationship to the displayed web page that have been visited and divides the number of visited links by the total number of links.

6. The apparatus of claim 1 wherein at least one display indicator comprises a bar graph.

7. The apparatus of claim 1 wherein at least one display indicator comprises an indication on a pointer when the pointer is placed over the link corresponding to the display indicator.

8. The apparatus of claim 1 wherein at least one display indicator comprises a color gradient.

9. A program product comprising:
   (A) a web page exploration indicator, the web page exploration indicator generating a display indicator for each link to another web page in a displayed web page, each display indicator being displayed in proximity to its corresponding link in the displayed web page, each display indicator providing a visual indication of the degree of exploration of its corresponding link according to at least one exploration criterion; and
   (B) computer-readable signal bearing media bearing the web page exploration indicator.

10. The program product of claim 9 wherein the signal bearing media comprises recordable media.

11. The program product of claim 9 wherein the signal bearing media comprises transmission media.

12. The program product of claim 9 wherein the web page exploration indicator further generates a display indicator that provides a visual indication of the degree of exploration for the displayed web page.

13. The program product of claim 9 wherein the at least one exploration criterion determines the total number of links on each page corresponding to each link, and divides the number of visited links by the total number of links.

14. The program product of claim 9 wherein the at least one exploration criterion determines the number of links on each page corresponding to each link to a predetermined level, and divides the number of visited links to the predetermined level by the number of links.

15. The program product of claim 9 wherein the at least one exploration criterion determines the total number links on pages with a specified relationship to the displayed web page that have been visited and divides the number of visited links by the total number of links.

16. The program product of claim 9 wherein at least one display indicator comprises a bar graph.

17. The program product of claim 9 wherein at least one display indicator comprises an indication on a pointer when the pointer is placed over the link corresponding to the display indicator.

18. The program product of claim 9 wherein at least one display indicator comprises a color gradient.

19. A method for visually indicating the degree of exploration of each link in a displayed web page, the method comprising the steps of:

determining at least one first exploration criterion; and displaying on the displayed web page a display indicator for each link to another web page in the displayed web page each display indicator being displayed in proximity to its corresponding link in the displayed web page, each display indicator providing a visual indication of the degree of exploration of its corresponding link according to the at least one first exploration criterion.

20. The method of claim 19 further comprising the step of:

determining the number of links that have been visited in each web page corresponding to each link on the displayed web page; and each display indicator indicating in the displayed web page the degree of exploration for its corresponding link according to the number of visited links.

21. The method of claim 19 further comprising the step of:

generating a display indicator in the displayed web page that indicates the degree of exploration for the displayed web page according to a second exploration criterion.

22. The method of claim 20 wherein the first exploration criterion determines the total number of links on each page corresponding to each link, and divides the number of visited links by the number of links.

23. The method of claim 19 wherein the first exploration criterion determines the number of links on each page corresponding to each link to a predetermined level, and divides the number of visited links to the predetermined level by the number of links.

24. The method of claim 19 wherein the first exploration criterion determines the total number of links on pages with a specified relationship to the displayed web page that have been visited and divides the number of visited links by the total number of links.

25. The method of claim 19 wherein the step of displaying a display indicator displays a bar graph.

26. The method of claim 19 wherein the step of displaying a display indicator displays an indication on a pointer when the pointer is placed over the link corresponding to the display indicator.

27. The method of claim 19 wherein the step of displaying a display indicator displays a color gradient.

* * * * *